May 7, 1963 R. KOBLER ET AL 3,089,002

DIAL MECHANISM FOR AUTOMATIC TELEPHONE DIALING MACHINES

Filed March 24, 1960 2 Sheets-Sheet 1

INVENTORS
RICHARD KOBLER
ROBERT M. SILVERMAN

BY George H. Fritzinger
AGENT

DIAL MECHANISM FOR AUTOMATIC TELEPHONE DIALING MACHINES

Filed March 24, 1960 2 Sheets-Sheet 2

INVENTORS
RICHARD KOBLER
ROBERT M. SILVERMAN
BY George H. Fritzinger
AGENT 3,089,002

DIAL MECHANISM FOR AUTOMATIC TELEPHONE DIALING MACHINES

Richard Kobler, West Orange, and Robert M. Silverman, Springfield, N.J., assignors to McGraw-Edison Company, Elgin, Ill., a corporation of Delaware Filed Mar. 24, 1960, Ser. No. 17,295
9 Claims. (Cl. 179—90)

The present invention relates to an improved dial mechanism for machines for recording telephone numbers in code form and for selectively reproducing the recorded numbers to feed dial pulses into a telephone line to make line connections with selected subscribers' stations. The present dial mechanism is intended particularly for use with telephone number recording and dialing machines of the character described in the pending Kobler et al. application Serial No. 784,258, filed December 31, 1958, now Patent No. 3,040,133, and the Kobler application Serial No. 829,881, filed July 27, 1959, both of which are entitled, "Telephone Calling Equipment." The dial mechanism for such machines includes a motor start switch for the recorder, an oscillator or signal control switch and an interdigital start switch. As will be understood, the interdigital start switch is part of a control system for providing a blank unrecorded space of predetermined length on the record between successive recordations representing the successive letters and/or digits of telephone numbers.

In recording each letter or digit of a telephone number the foregoing control switches must be operated in a very precise relationship to assure reliable operation of the telephone number recording and dialing machine. An object of the present invention is to provide a dial mechanism of improved and simplified mechanical design which will meet these rigid performance requirements without requiring stringent mechanical tolerances on the component parts.

Another object is to provide such improved dial mechanism which is reliable and stable in operation and economical to manufacture.

Other objects and features of the invention reside in the novel combinations of mechanical elements hereinafter particularly described and claimed, and will be apparent from the following description.

In the description of the invention reference is had to the accompanying drawings, of which:

Figure 6:
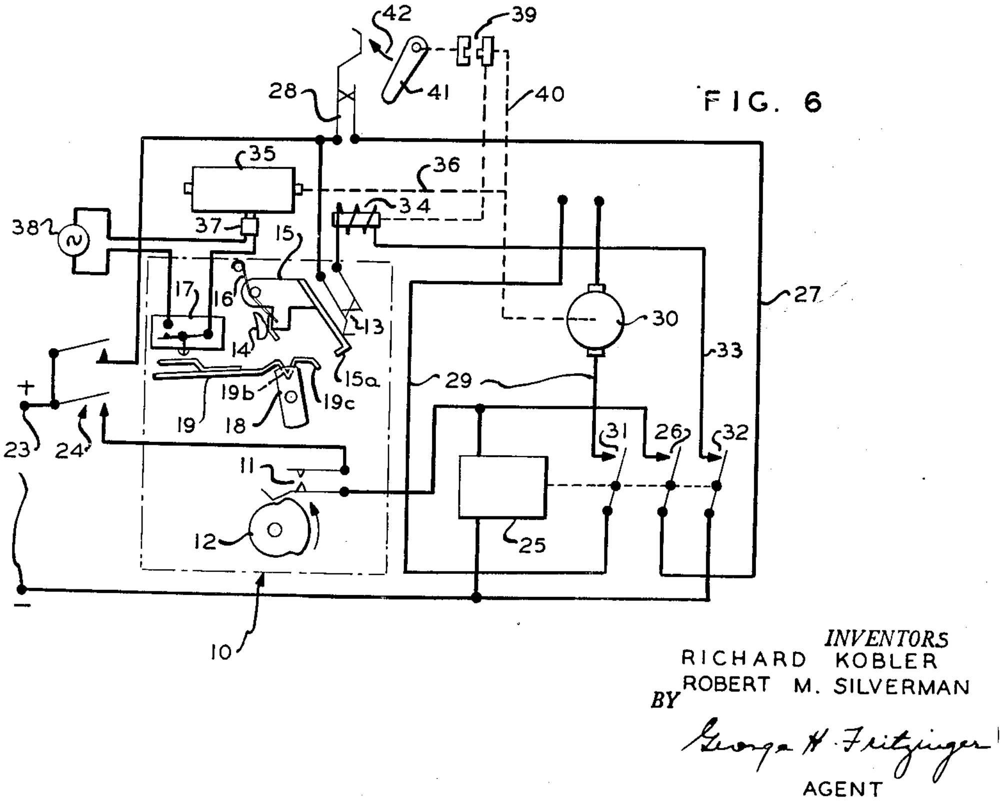
FIGURE 6 is a diagrammatic view of circuits and mechanism showing in elemental form the circuits of the telephone number recording and dialing machine controlled by the respective switches of the dial.

Although the present invention resides especially in the mechanical design of the dial mechanism per se, this mechanism can best be understood by first describing the functions of the dial switches in controlling the telephone number recording and dialing machine. With reference therefore first to the circuit diagram of FIGURE 6, wherein the dial mechanism is represented fractionally by the dash-dot inclosure 10, it will be seen that this dial mechanism includes a normally open motor start-stop switch 11 of a pulsing type operated by a single-lobe rotary cam 12, an interdigital start switch 13 normally held closed by a cam element 14 operating against an intermediate lever 15 biased by a spring 16 and effective when released to serve also as a latch as will appear, and a normally open signal control switch 17 for example of the push button snap action type which is operable closed by a two lobe cam 18 acting against a switch arm 19 which when operated is held latched by a catch element 15*a* on the lever 15 just mentioned. The dial mechanism includes also the usual rotatable dial 20 provided with the usual finger holes 21 and with a finger rest 22 shown in FIGURE 7.

As in the usual procedure, the dial is operated by placing the finger in a selected digit hole and turning the dial clockwise until the finger abuts against the finger stop, and then releasing the dial to return to home position. In the present dial mechanism, the interdigital start switch 13 is opened by the initial wind-up movement of the dial through approximately one half digit interval, a digit interval being herein referred to as the angle subtended by the arc between two successive digit holes. No further operations occur during the wind-up of the dial; even the initial operation of the inter-digital start switch is without any immediate effect on the operation of the machine. However, upon release of the dial from an operated position defined by the position which the dial has when the finger in a finger hole is in abutment against the finger rest 22, the following timed operations occur: the motor start switch 11 is closed in about 10 milliseconds and the signal control switch 17 is closed in about 80 milliseconds. Thereupon, as will be apparent, when the dial is 80 milliseconds from home position the signal control switch is reopened, and when the dial is about 50 milliseconds from home position the interdigital start switch 13 is reclosed to take over control of the motor.

A source of D.C. power is supplied via the two terminals 23 and a double pole on-off switch 24 which when operated is latched by suitable means not herein necessary to show. When the on-off switch 24 is closed a circuit is prepared through the motor switch 11 and a motor relay 25 to cause the relay to be operated in 10 milliseconds from the instant the dial is released from an operated position. The instant the relay 25 is operated it obtains a holding circuit through its switch 26, line 27, normally closed interdigital switch 28 and the on-off switch 24. The relay 25 therefore remains operated notwithstanding the pulsing operation of the motor switch 11. Operation of the motor relay 25 completes a circuit 29 for a constant speed motor 30 through a second switch 31 of the relay. Also, operation of the relay 25 closes a switch 32 to prepare a circuit 33 through an advance clutch solenoid 34, the interdigital start switch 13 and the on-off switch 24 to the D.C. source 23; however, this circuit is not immediately activated because the interdigital start switch 13 is open when the motor switch 11 is first closed as before explained. The motor reaches speed in about 50 milliseconds and rotates a record carrier 35 through a drive coupling 36. Engaging the record carrier is a recorder head 37. In 80 milliseconds from the instant the dial was released from operated position, the recorder head receives a signal from a source 38 through the signal control switch 17 and starts recording the signal on the record. Furthermore, at about 80 milliseconds before the dial is returned home, the switch 17 is opened to terminate the signal time band recorded on the record. About 50 milliseconds before the dial is returned home the interdigital start switch 13 is reclosed to take over control of the motor relay. For instance, when the switch 13 is closed the clutch solenoid 34 is activated to engage an advance clutch 39. The advance clutch 39 connects the drive transmission 40 between the motor 30 and a timing arm 41, causing the arm to start turning at a fixed speed in the direction of the arrow 42. About 500 milliseconds after the clutch 39 is engaged the arm 41 opens the interdigital switch 28 to break the hold circuit 27 of the motor relay 25 causing the relay to drop out and stop the motor 30. By this dropout of the motor relay the apparatus is restored to its start condition.

From the foregoing general description, it is apparent that upon dialing each digit a continuous signal is recorded on the record carrier for a duration depending on the digit dialed followed by a blank interdigital space on the drum of about 500 milliseconds duration. When the machine is used to make telephone calls such continuous signal bands are converted back to dial pulses as later described.

Figure 2:
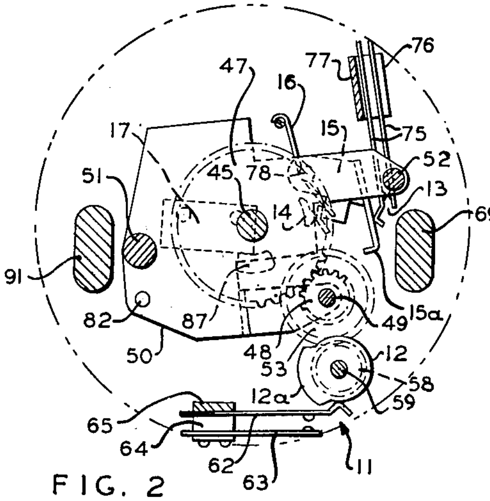
FIGURE 2 is a fractional sectional view taken at right angles to the dial axis substantially on the line 2—2 of FIGURE 1.
Figures 4, 5:
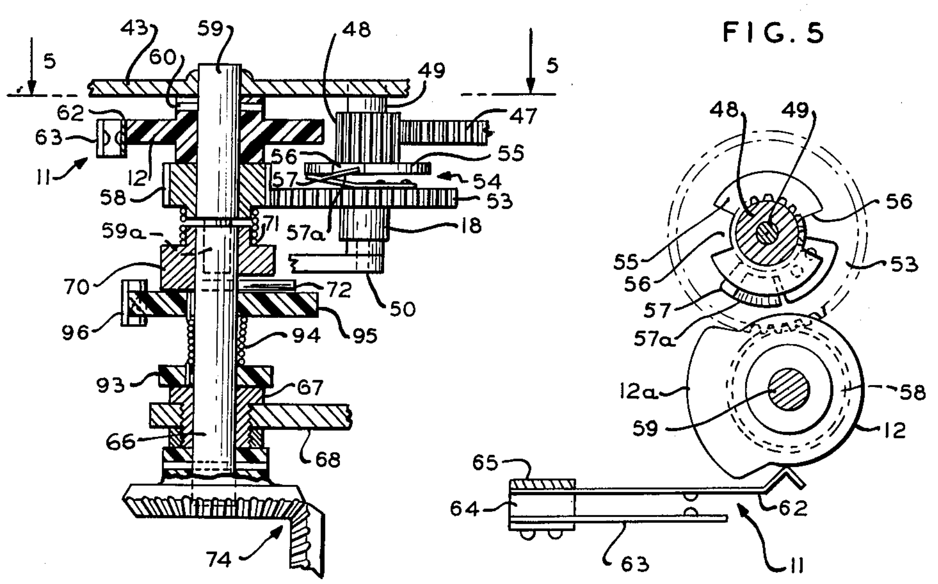
FIGURE 4 is a fractional sectional view parallel to the dial axis as seen substantially from the line 4—4 of FIGURE 1.
FIGURE 5 is a fractional section taken on the line 5—5 of FIGURE 4.

The dial mechanism has a circular frame plate 43 provided with a central bearing 44 in which is journaled a shaft 45 of the dial 20. Surrounding the bearing is a torsion spring 46 interconnected between the shaft and the frame to urge the dial counterclockwise to its home or start position. Secured to the lower end of the shaft 45 is a gear 47 of a gear train including an intermediate pinion gear 48 journaled on a shaft 49 secured at its upper end in the frame plate 43 (FIGURES 2 and 4) and at its lower end in a bracket plate 50 secured by screws to two posts 51 and 52 depending from the frame plate. The intermediate pinion gear 48 receives from the gear 47 one-half revolution for each digit interval of movement of the dial 20. Below the pinion gear 48 and on the same shaft 49 is a larger gear 53 coupled to the former by means of a one-way ratchet clutch 54 (FIGURES 4 and 5). This ratchet clutch comprises a flange 55 on the pinion gear provided with two diametrically opposite notches 56, and an arcuate leaf spring 57 riveted to the larger gear 53 and provided with a one-way catch finger **57*a* for engaging the flange at either of two diametrically opposite points only in clockwise movement of the gear 48 as seen in FIGURE 5. Thus, the gear 53 does not receive any movement from the dial during windup but is driven in a clockwise direction during return of the dial from an operated position. Gear 53 engages a pinion gear 58 secured to a shaft 59 journaled at its upper end in the frame plate 43. Secured also to this shaft as by a cross pin 60 is the disk-shaped cam 12 having a single lobe 12*a*. Gears 58 and 53 have a stepped-up turns ratio of 2:1 causing the cam 12** to be driven one full revolution for each digit interval of return movement of the dial.

The motor switch 11 comprises a contact spring 62 engaging the cam 12 just counterclockwise from the lobe **12*a* thereof. Associated with the contact spring 62 is an adjacent stationary contact spring 63 the contacts of which stand normally in open position. These contact springs are mounted in an insulating stack 64 secured to a bracket 65** depending from the frame plate and shown fractionally in FIGURE 1.

When the dial is in home position as well as during windup of the dial to an operated position the ratchet clutch 54 stands in a midposition between its two engagement points requiring a one-quarter turn of the pinion gear 48 corresponding to a one-half digit interval of return movement of the dial to engage the ratchet clutch. In the standard telephone dial the finger holes are spaced at 30° intervals with a spacing of the first digit hole from the finger stop requiring a two-interval windup to dial the digit "1." In the present dial the finger holes are at about 28° intervals with a spacing of two and one-half intervals of the finger hole for digit "1" from the finger stop. This additional one-half digit interval of windup movement of the present dial is utilized in the initial return movement of the dial from an operated position to take up the slack in the ratchet clutch 54. Almost immediately after the ratchet clutch 54 is engaged—typically within about 10 milliseconds—the cam 12 is turned sufficiently to close the motor switch 11.

The shaft 59 for the motor-switch cam 12 has a reduced diameter extension **59*a* at its lower end telescoping rotatably with a tubular end portion of a coaxial shaft 66 extending downwardly from the shaft 59 and journaled near its lower end portion in a bearing 67 threaded through a sidearm 68 of a standard 69 depending from the frame plate. Directly below the gear 58 on the shaft 59 is a collar 70 on the shaft 66. The gear 58 and collar 70 have confronting hubs of equal diameter on which is wound a one-way clutch spring 71 operative to couple the gear 58 to the collar 70 only in counterclockwise movement thereof as it would appear in FIGURE 5—which is the direction of movement imparted to the gear 58 during return of the dial from an operated position. The collar 70 has a lost-motion connection with the shaft 66 provided by a radial pin 72 in the shaft engaging a sector-shaped cut-out 73 in the collar subtending about a 60° angle about the center of the shaft. The lower end of the shaft 66 is coupled by right angle gearing 74 to a shaft of the constant speed motor 30. By this coupling the shaft 66** is turned by the motor precisely at a speed of one revolution each 100 milliseconds.

Since the motor 30 turns the shaft 66 counterclockwise the pin 72 stands normally at the counter-clockwise end of the cut-out 73. The spring 46 tends to return the dial at an above-normal speed. Thus, as soon as the ratchet clutch 54 is taken up after release of the dial from an operated position it starts turning the collar 70 counterclockwise at a fast speed to take up quickly the lost-motion connection 72—73 because the dial at this instant is unimpeded in its return movement. Typically, the lost-motion connection is taken up within about 15 milliseconds from the instant the ratchet clutch 54 is engaged. Since the cam 12 operates the motor switch in much less than the 60° turning movement of the cam necessary to take up the lost-motion connection, the motor switch is closed well within the 15 millisecond interval utilized in taking up the lost-motion connection.

After the lost-motion connection 72—73 is taken up the return spring 46, by its tendency to return the dial at an above-normal speed, maintains the one-way coupling spring 71 in locked engagement with the hubs of the gear 58 and collar 70 to cause the constant speed motor 30 to act as a brake and maintain the return movement of the shaft 59 precisely to a rate of one revolution per 100 milliseconds. The instant the dial reaches home position the cam 12 is stopped in the position shown in FIGURE 6 but the motor relay is kept activated by its hold circuit 27 to keep the motor 30 running with the radial pin 72 being moved to the counterclockwise end of the notch 73 and with slippage of the one-way clutch spring 71. However, as before-mentioned, about 50 milliseconds prior to the dial reaching home position the interdigital start switch 13 is operated as will next appear.

The interdigital start switch 13 comprises a pair of contact springs 75 in an insulating stack 76 mounted on a bracket 77 (fractionally shown) depending from the frame plate 43. The contact springs are mounted parallel with the frame plate and are operated by the lever 15 pivoted at 78 to the bracket plate 50. The lever 15 is biased clockwise (FIGURE 3) away from the interdigital start switch 13 by the torsion spring 16. However, when the dial is at home position the lever 15 is held constrained in a counterclockwise position by the cam 14 on the gear 47 to hold the interdigital start switch 13 closed. The cam 14 engages an obliquely shaped lug **15*b* on the lever 15 (FIGURE 3) which when the dial is wound up one-half digit interval allows sufficient release of the lever 15** to open the interdigital start contacts 13 but it is not until the dial has been wound up through a full digit interval that the lug 15b is disengaged from the inner step of the cam 14 to allow full release of the lever. Vice versa, when the dial in its return movement from an operated position comes within about one interval from home position it begins to move the lever 15 counterclockwise and when the dial is one-half digit interval corresponding to 50 milliseconds from home position the lever 15 is moved sufficiently to reclose the interdigital start switch 13.

Figures 1, 7:
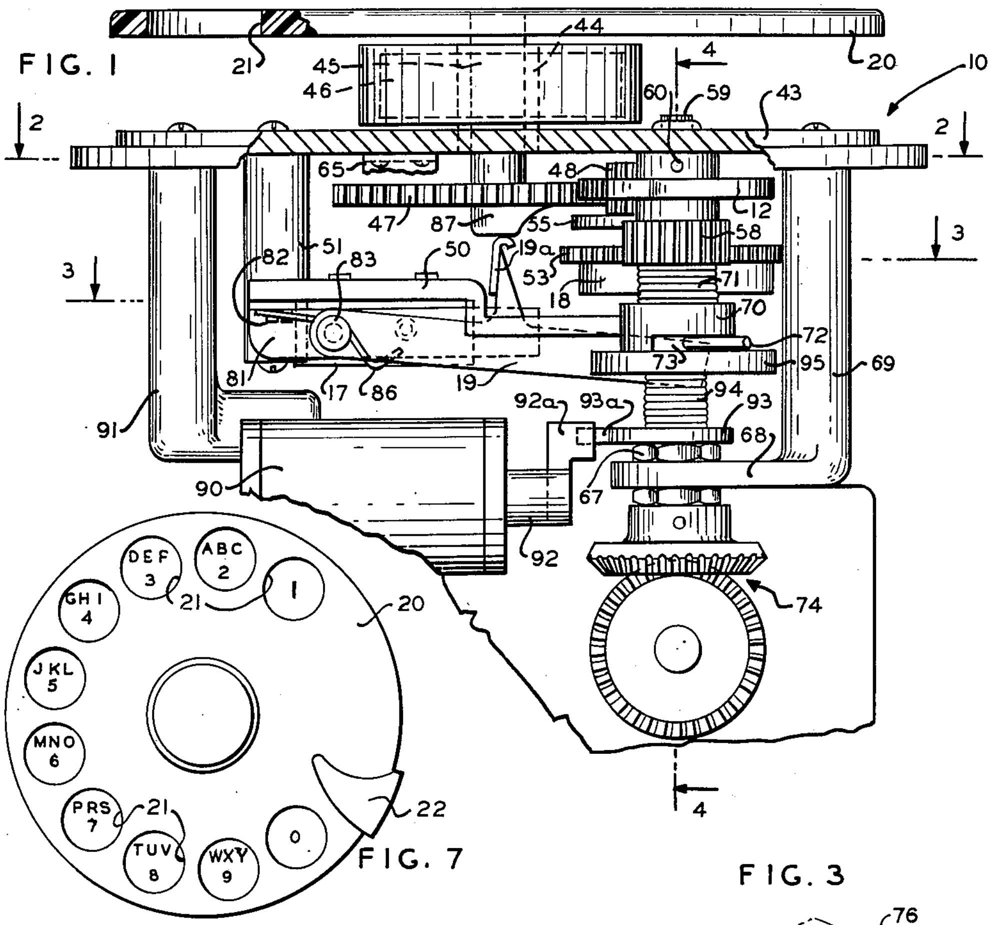
FIGURE 1 is a principally side elevational view of the present dial mechanism.
FIGURE 7 is a plan view of the dial plate per se of the present dial mechanism.
Figure 3:
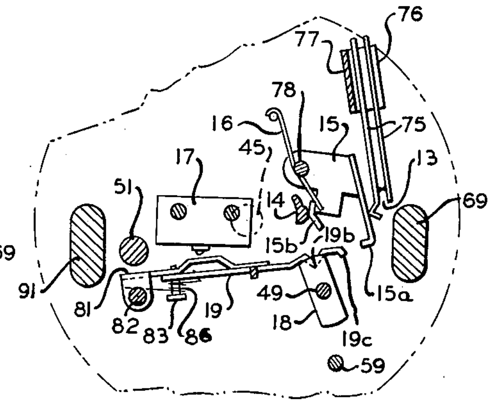
FIGURE 3 is another fractional view similar to FIGURE 2 as seen substantially from the line 3—3 of FIGURE 1.

The signal switch 17 is a button type microswitch mounted on the bracket plate 50 to one side of the dial axis opposite the shaft 49 as shown in FIGURE 3. The switch is operated by a laterally movable lever 81 pivoted at 82 to the bracket plate 50 on an axis parallel with that of the dial. However, pivoted to the lever 81 on an axis 83 at right angles to the pivot axis 82 is the operating arm 19 for the switch 17. This arm extends past the central axis of the dial and past the two-lobe bar-shaped cam 18 (FIGURE 3) secured to the bottom side of the gear 53 in concentric relation with the shaft 49. The end portion of the arm adjacent to the cam 18 has a V-shaped portion 19b with an extending lip 19c terminating in the path of the catch 15a of the lever 15. The arm 19 is biased upwardly into a horizontal position about the axis 83 by a torsion spring 86 but is normally held in a downwardly inclined position, wherein the end portion of the arm is below the cam 18, by means of a cam 87 depending from the gear 47 and engaging an upstanding finger 19a of the arm 19 (FIGURE 1).

When the dial 20 is in home position the cam 18 is positioned crosswise to the arm 19 as shown in FIGURE 3. During about the first one-quarter digit interval of windup movement of the dial, the cam 87 moves off of the finger 19a and the arm 19 is moved upwardly by the torsion spring 86 with abutment of the V portion 19b of the arm against one lobe of the cam 85. During the entire windup of the dial the cam 18 and arm 19 remain in these positions. When the dial is released from an operated position it first is moved through the one-half digit interval engaging the ratchet clutch 54 and then begins driving clockwise the cam 18 at the rate of one-half revolution per digit interval of return movement of the dial. The instant the first lobe of the cam 18 clears the V portion 19b the arm 19 is snapped upwardly to place the V portion 19b in the path of the next oncoming lobe of the cam 18. In less than one-half revolution of the cam 18 this next lobe engages the V portion 19b and cams the arm 19 counterclockwise to close the signal switch 17. This occurs in about 80 milliseconds from the instant the ratchet clutch 54 is engaged. The lever 15, which stands already in a released position is engaged at its catch element 15a by the lip 19c of the arm 19 as the arm 19 is cammed to operate the switch 17 and by this engagement with the catch 15a the arm 19 is latched to retain the signal switch closed.

During return of the dial the cam 18 kicks the arm 19 slightly counterclockwise during each digit interval of return movement. This has no effect until the dial enters its last digit interval, at which time the effect is to free the lip 19c of the arm from the catch 15a momentarily at the instant the catch is being disengaged by the cam 14. Thereupon in the ensuing return movement of the dial the arm 19 follows the cam 18 and causes the signal switch to be opened precisely at about 80 milliseconds before the dial reaches home. When the dial is about one-quarter digit interval from home the arm 19 is cammed downwardly out of the path of the next oncoming lobe of the cam 18 and with the cam then coming to rest in the position indicated in FIGURE 3.

To summarize the operation of the dial mechanism, (1) after about one-quarter digit interval of windup movement of the dial from home position the switch arm 19 is released against one lobe of the cam 18 by the cam 87, (2) about one-half digit interval from home position during windup of the dial the inter-digital start switch 13 is opened and at one digit interval from home position the catch lever 15 is fully released to a latching position, (3) upon release of the dial from an operated position the ratchet clutch 54 is engaged after one-half digit interval of return movement, (4) about 10 milliseconds after the ratchet clutch 54 is engaged the motor switch 11 is first closed, (5) about 15 milliseconds after the ratchet clutch 54 is engaged the lost-motion connection 72—73 is taken up causing the dial to be joined with and governed by the motor 30 in its return movement, (6) about 80 milliseconds after the ratchet clutch 54 is engaged the arm 19 is cammed to close the signal switch 17 with concurrent latching of the arm 19 in its operated position by the latch lever 15, (7) at about one interval from home position of the dial the latch lever 15 is disengaged from the arm 19, (8) at about 80 milliseconds from home position the arm 19 is returned sufficiently under control of the cam 18 to open the signal switch 17, (9) at about 50 milliseconds from home the interdigital switch 13 is reclosed, (10) and at about 25 milliseconds from home the switch arm 19 is cammed downwardly out of the path of the cam 18. During all of the foregoing operations occurring during the return of the dial from an operated position, the motor switch 11 is pulsing but without any effect on the system since the motor relay 25 is locked in operated position by its holding circuit 27 the instant the motor switch was first closed. This hold circuit 27 is not opened until about 500 milliseconds after the signal switch is opened, at which instant the interdigital switch 28 is operated by the motor 30 to drop out the motor relay and stop the motor.

During playback the recorded signal bands picked up from the record are amplified and fed to a dialing solenoid 90 supported by a standard 91 depending from the frame plate 43. The solenoid 90 has an armature 92 provided with a side arm 92a which normally engages a single peripheral tooth 93a of a disk 93 forming part of an integrating full revolution clutch. The disk 93 is journaled on the shaft 66 and is connected through a torsion spring 94 to a dialing cam 95 also journaled on the shaft 66. Spring 94 tends to grip the shaft 66 but is withheld so long as disk 93 is held from turning by reason of the frictional contact of the shaft with the spring tending to unwind the latter. However, the instant the disk is released the spring becomes locked to the shaft to start driving the dialing cam 95. Thus, any momentary activation of the solenoid 90 as of only 20 to 40 milliseconds, will cause the dialing cam to be driven through one full revolution, and longer periods of activation greater by any number of 100 millisecond intervals will cause the dialing cam to be driven through a correspondingly greater number of complete revolutions. Dialing cam 95 is of a single-lobe type operating a switch 96 indicated in FIGURE 4 to produce one dial pulse per revolution of the cam. For a further description of the playback operation reference may be had to the pending applications aforementioned.

The particular embodiment of our invention herein shown and described is intended to be illustrative and not limitative of our invention since the same is subject to changes and modifications without departure from the scope of our invention, which we endeavor to express according to the following claims:

We claim:

1. A dial mechanism for a machine for recording telephone numbers in code form, comprising a rotary dial having finger holes and a finger stop enabling the dial to be wound-up to selected operated positions according to respective digits and letters to be dialed, the first finger hole of the dial being at two digit intervals plus a fractional interval from the finger stop, means for returning the dial when released from an operated position, a motor start switch, a rotary cam for operating said motor switch, a drive coupling between said dial and cam including a one-way ratchet clutch for driving the cam only during return of the dial to home position, said ratchet clutch comprising a first rotary clutch member in permanent coupled relation to said dial and a cooperating second rotary clutch member in permanent coupled relation to said cam, said clutch members having spaced points of inter-engagement and said first clutch member being moved to a mid-position between said engagement points when said dial reaches an operated position, and said coupling having a transmission ratio to cause said ratchet clutch to be engaged by the initial return of said dial from an operated position through said fractional digit interval.

2. A dial mechanism for a machine for recording telephone numbers in code form, comprising a rotary dial having finger holes and a finger stop enabling the dial to be wound up to selected operated positions according to respective digits and letters to be dialed, means for returning the dial when released from an operated position, a signal control switch, an operating arm for said switch, a rotary cam having two diametrically opposite lobes for operating said switch arm, means pivoting said switch arm about one axis for movement to operate said switch and about a second transverse axis for movement into and out of the path of said cam, a one-way transmission for driving said cam only during return of the dial and at a speed of one-half revolution for each digit interval of return movement of the dial, and spring means controlled by the initial return movement of the dial from an operated position for first moving said switch arm sidewise against a first lobe of said two-lobe cam and then into said path upon passage of the first lobe of the cam out of the way of the arm whereby the second lobe of the cam will engage the arm and operate said switch after the dial has moved through a prescribed distance from an operated position.

3. The dial mechanism set forth in claim 2 including a latch member for holding said switch arm in operated position, and means controlled by said dial as the dial enters a last digit interval of return movement for releasing said latch member while said switch arm is in engagement with a lobe of said cam to cause the switch to be returned under control of said cam during the last digit interval of return movement of the dial.

4. The dial mechanism set forth in claim 3 including an interdigital start switch and means for operating said interdigital start switch into closed and open positions respectively as said latch member is moved to non-latching and latching positions.

5. A dial mechanism set forth in claim 4 including means controlled by said dial for moving said latch member to latching and non-latching positions respectively as the dial is moved from and to home position.

6. A dial mechanism for a machine for recording telephone numbers in code form, comprising a rotary dial biased to home position and having a series of finger holes and a finger rest enabling the dial to be wound up to selected operated positions and then released to dial selected digits and letters of telephone numbers, a motor switch, a rotary cam for operating said motor switch to a start position when the cam has moved through a predetermined angular distance, means for driving the cam only during return of the dial to home position, spring means connected to said dial and tending to return the dial at an above-normal speed, and means for limiting return movement of the dial to a normal speed comprising a constant speed motor started by movement of said motor switch to start position, a coupling between said rotary cam and motor including a one-way transmission engaged under influence of said spring means during return of the dial, and a lost-motion connection included in said coupling and taken up by movement of said cam after said motor is started.

7. The dial mechanism set forth in claim 6 wherein said finger holes are grouped relative to said finger rest to require a windup of the dial through two and one-half digit intervals to dial digit "1," including a ratchet clutch between said cam and dial having a predetermined lost motion taken up by the first one-half digit interval of return movement of the dial, including a second rotary cam having two diametrically opposite lobes, means for driving said second cam through said ratchet clutch at one-half revolution per digit interval of return movement of the dial, a signal control switch, an operating arm for said signal control switch shiftable sidewise into and out of the path of said second cam, means biasing said operating arm into said path, and means controlled by said dial for holding said operating arm out of said path when the dial is in home position and for releasing the arm as the dial is moved from home position, said second cam being normally in a crosswise position relative to said arm causing the arm to be shifted by said biasing means against one lobe of said second cam during initial windup of the dial and to be shifted into said path and operated by the second lobe of said second cam during initial rotation of the cam responsive to return of the dial from an operation position.

8. The dial mechanism set forth in claim 7 including an interdigital start switch biased into open position, a pivoted lever for operating said interdigital start switch biased to a non-operating position, cam means controlled by said dial for normally holding said lever in a switch operating position, said cam means being adapted to release said lever by a first one-half digit interval of windup movement of said dial from home position, catch means on said lever rendered effective by one digit interval of windup movement of the dial from home position for engaging and holding said switch arm of said signal control switch in operated position the instant the control switch is operated by return of the dial from an operated position, said catch means being released by return of said dial when the dial enters its last digit interval of return movement and said second cam being timed to engage said switch arm and control return of said signal control switch to unoperated position during the further return movement of said dial following the disengagement of said catch means from said switch arm.

9. A telephone dial mechanism for a machine for recording telephone numbers in code form, comprising a rotary dial manually movable into selective operated positions according to digits and letters to be dialed, spring means for returning said dial upon release from an operated position, a motor start switch, a signal control switch, an interdigital start switch, a rotary cam for operating said motor start switch, coupling means including a one-way clutch for driving said rotary cam by said dial only during return of the dial from an operated position, a first cam actuated means controlled by said dial for holding said interdigital start switch operated while the dial is in home position, a second cam actuated means controlled by said dial for operating said signal control switch upon return of the dial from an operated position, a latch for holding said signal control switch in operated position, and means for releasing said latch by said first cam actuated means as said dial is returned to home position.

References Cited in the file of this patent

UNITED STATES PATENTS

| | | |
|---|---|---|
| 2,892,897 | Vidal | June 30, 1959 |
| 2,919,311 | Leney | Dec. 29, 1959 |
| 2,941,043 | Ham | June 14, 1960 |